United States Patent
Takeda et al.

(10) Patent No.: US 11,575,489 B2
(45) Date of Patent: Feb. 7, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Kazuaki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/622,839

(22) PCT Filed: Jun. 15, 2017

(86) PCT No.: PCT/JP2017/022217
§ 371 (c)(1),
(2) Date: Dec. 13, 2019

(87) PCT Pub. No.: WO2018/229954
PCT Pub. Date: Dec. 20, 2018

(65) Prior Publication Data
US 2020/0205133 A1 Jun. 25, 2020

(51) Int. Cl.
*H04W 72/04* (2009.01)
*H04L 5/00* (2006.01)
*H04L 27/26* (2006.01)

(52) U.S. Cl.
CPC .......... *H04L 5/0094* (2013.01); *H04L 5/0044* (2013.01); *H04W 72/042* (2013.01); *H04L 27/2602* (2013.01)

(58) Field of Classification Search
None
See application file for complete search history.

(56) References Cited

U.S. PATENT DOCUMENTS 11,343,661 B2 * 5/2022 Horiuchi ................. H04W 4/70
2009/0325585 A1 * 12/2009 Farajidana ............ H04W 72/14
455/450

(Continued)

FOREIGN PATENT DOCUMENTS

EP         3567954 A1    11/2019
KR  10-2011-0137751 A   12/2011
(Continued)

OTHER PUBLICATIONS

3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall Description; Stage 2 (Release 8)"; Mar. 2010 (149 Pages).

(Continued)

*Primary Examiner* — Duc T Duong
(74) *Attorney, Agent, or Firm* — Osha Bergman Watanabe & Burton LLP

(57) ABSTRACT

A terminal is disclosed including a receiver that receives information indicating one of a first Resource Block Group (RBG) configuration and a second RBG configuration by which a plurality of RBG size candidates are respectively configured, and a processor that determines a RBG size out of RBG size candidates included in an RBG configuration selected out of the first RBG configuration and the second RBG configuration. In other aspects a radio communication method is also disclosed.

10 Claims, 11 Drawing Sheets

(56) References Cited

U.S. PATENT DOCUMENTS

| | | | |
|---|---|---|---|
| 2012/0014330 A1* | 1/2012 | Damnjanovic | H04L 5/001 370/329 |
| 2012/0307771 A1* | 12/2012 | Yang | H04L 5/0091 370/329 |
| 2013/0128852 A1* | 5/2013 | Xue | H04W 72/1252 370/329 |
| 2013/0250906 A1* | 9/2013 | Golitschek Edler von Elbwart | H04L 5/0037 370/330 |
| 2015/0208387 A1* | 7/2015 | Awad | H04W 72/042 370/329 |
| 2015/0319742 A1* | 11/2015 | Koivisto | H04L 5/0053 370/329 |
| 2015/0341951 A1* | 11/2015 | Sun | H04L 5/14 370/330 |
| 2016/0142919 A1* | 5/2016 | Baldemair | H04W 16/10 455/447 |
| 2016/0234813 A1 | 8/2016 | Kim et al. | |
| 2018/0049203 A1* | 2/2018 | Xue | H04L 5/0053 |
| 2018/0063843 A1* | 3/2018 | Akkarakaran | H04L 5/0094 |
| 2018/0069672 A1* | 3/2018 | Horiuchi | H04L 5/0044 |
| 2018/0070339 A1* | 3/2018 | Horiuchi | H04L 5/0053 |
| 2018/0279354 A1* | 9/2018 | Nory | H04L 5/0094 |
| 2019/0191486 A1* | 6/2019 | Myung | H04W 76/27 |
| 2019/0260530 A1* | 8/2019 | Yi | H04L 5/0094 |
| 2019/0260548 A1* | 8/2019 | Parkvall | H04W 72/042 |
| 2020/0092072 A1* | 3/2020 | Yamamoto | H04L 5/0092 |
| 2020/0120680 A1* | 4/2020 | Hwang | H04L 5/0044 |
| 2020/0136774 A1* | 4/2020 | Tang | H04W 72/042 |
| 2021/0126756 A1* | 4/2021 | Horiuchi | H04L 5/0044 |
| 2021/0127367 A1* | 4/2021 | Yi | H04W 72/0453 |
| 2021/0136796 A1* | 5/2021 | Seo | H04L 5/0028 |
| 2022/0070852 A1 | 3/2022 | Iwai et al. | |

FOREIGN PATENT DOCUMENTS

| | | |
|---|---|---|
| WO | 2016161917 A1 | 10/2016 |
| WO | 2018223352 A1 | 12/2018 |

OTHER PUBLICATIONS

International Search Report issued in PCT/JP2017/022217 dated Aug. 22, 2017 (5 pages).

Written Opinion of the International Searching Authority issued in PCT/JP2017/022217 dated Aug. 22, 2017 (3 Pages).

Extended European Search Report issued in counterpart European Patent Application No. 17913749.2, dated Dec. 2, 2020 (7 pages).

ZTE; "On PRB Bundling"; 3GPP TSG RAN WG1 Meeting #89, R1-1707116; Hangzhou, P.R. China; May 15-19, 2017 (4 pages).

Samsung; "sPDSCH design"; 3GPP TSG RAN WG1 Meeting #89, R1-1707896; Hangzhou, P.R. China; May 15-19, 2017 (3 pages).

Office Action issued in the counterpart European Patent Application No. 17913749.2 dated May 20, 2021 (5 pages).

Office Action issued in the counterpart Korean Patent Application No. 10-2020-7000104, dated Apr. 29, 2021 (10 pages).

Samsung; "DL Resource Allocation Aspects"; 3GPP TSG RAN WG1 Meeting #89, R1-1708017; Hangzhou, China; May 15-19, 2017 (8 pages).

Office Action issued in the counterpart Korean Patent Application No. 10-2020-7000104, dated Nov. 12, 2021 (10 pages).

Intel Corporation; "Discussion on DL control signaling for Rel-13 CA"; 3GPP TSG-RAN WG1 #81, R1-152623; Fukuoka, Japan; May 25-29, 2015 (4 pages).

NTT DOCOMO, Inc.; "Way forward on RBG size"; 3GPP TSG RAN WG1 Meeting #89, R1-1709740; Hangzhou, P.R. China; May 15-19, 2017 (3 pages).

NEC; "Frequency and time resource allocation schemes for NR"; 3GPP TSG-RAN WG1 Meeting #89, R1-1707200 Hangzhou, P.R. China; May 15-19, 2017 (5 pages).

Guangdong OPPO Mobile Telecom; "On resource sharing between PDCCH and PDSCH"; 3GPP TSG RAN WG1 Meeting #89, R1-1707708; Hangzhou, P.R. China; May 15-19, 2017 (6 pages).

Office Action issued in the counterpart Chinese Patent Application No. 201780092080.X, dated Jan. 5, 2022 (12 pages).

Office Action in counterpart Korean Patent Application No. 10-2020-7000104 dated Jun. 20, 2022 (6 pages).

Office Action issued in Indian Application No. 201937051870; dated Feb. 9, 2022 (7 pages).

Office Action issued in European Application No. 17913749.2; dated Mar. 30, 2022 (4 pages).

Office Action issued in the counterpart Chinese Patent Application No. 201780092080.X, dated Jul. 19, 2022 (19 pages).

Office Action issued in Egyptian Application No. 2019121985 dated Sep. 8, 2022 (9 pages).

Office Action in counterpart Korean Patent Application No. 10-2020-7000104 dated Oct. 10, 2022 (8 pages).

\* cited by examiner

| $\left\lceil N_{RB}^{DL}/P \right\rceil$ | $N_{RB}^{DL}$ | | | | | | | |
|---|---|---|---|---|---|---|---|---|
| P | 25 | 50 | 75 | 100 | 150 | 200 | 250 | 275 |
| 2 | 13 | 25 | 38 | 50 | 75 | 100 | 125 | 138 |
| 3 | 9 | 17 | 25 | 34 | 50 | 67 | 84 | 92 |
| 4 | 7 | 13 | 19 | 25 | 38 | 50 | 63 | 69 |
| 6 | 5 | 9 | 13 | 17 | 25 | 34 | 42 | 46 |
| 8 | 4 | 7 | 10 | 13 | 19 | 25 | 32 | 35 |
| 12 | 3 | 5 | 7 | 9 | 13 | 17 | 21 | 23 |
| 16 | 2 | 4 | 5 | 7 | 10 | 13 | 16 | 18 |

FIG. 1

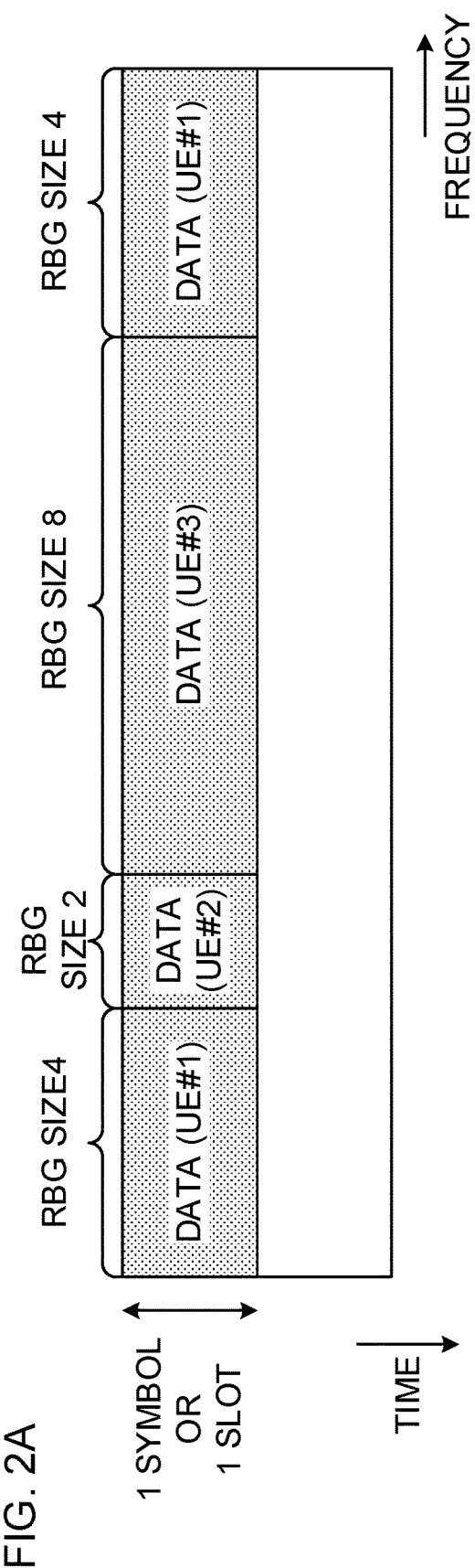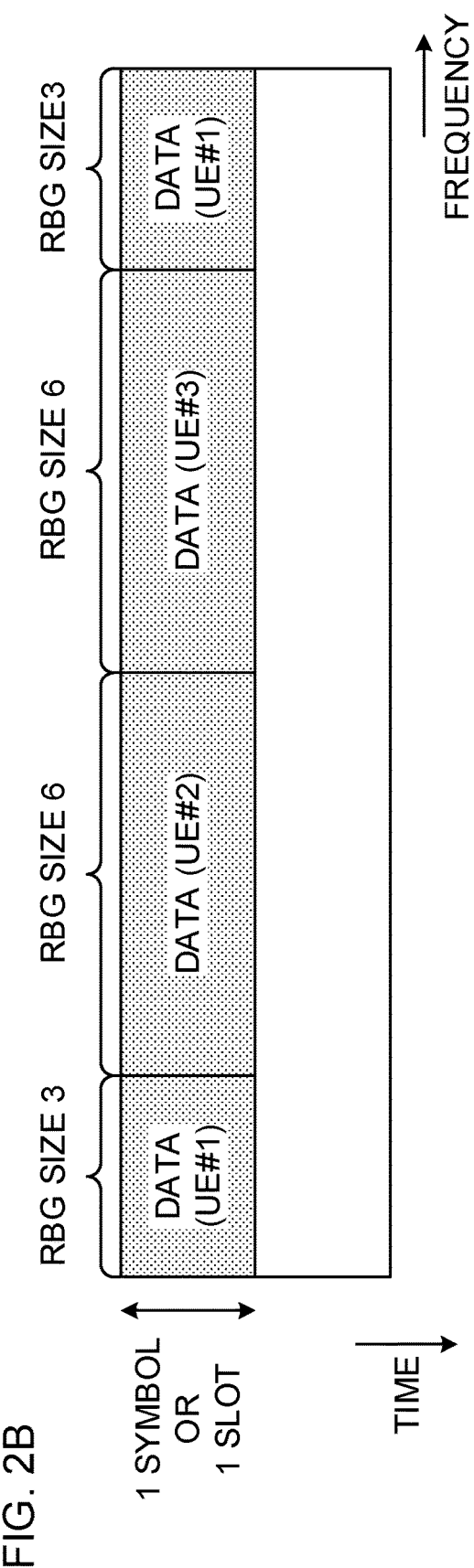

| $\left\lceil N_{RB}^{DL}/P \right\rceil$ | | | | | | | | | |
|---|---|---|---|---|---|---|---|---|---|
| $N_{RB}^{DL}$ | | | | | | | | | |
| P | 25 | 50 | 75 | 100 | 150 | 200 | 250 | 275 |
| 2 | 13 | 25 | 38 | 50 | 75 | 100 | 125 | 138 |
| 3 | 9 | 17 | 25 | 34 | 50 | 67 | 84 | 92 |
| 4 | 7 | 13 | 19 | 25 | 38 | 50 | 63 | 69 |
| 6 | 5 | 9 | 13 | 17 | 25 | 34 | 42 | 46 |
| 8 | 4 | 7 | 10 | 13 | 19 | 25 | 32 | 35 |
| 12 | 3 | 5 | 7 | 9 | 13 | 17 | 21 | 23 |
| 16 | 2 | 4 | 5 | 7 | 10 | 13 | 16 | 18 |

FIG. 4

| $\lceil \log 2(N_{RB}^{UL}(N_{RB}^{UL}+1)/2) \rceil$ | $N_{RB}^{UL}$ | | | | | | | |
|---|---|---|---|---|---|---|---|---|
| | 25 | 50 | 75 | 100 | 150 | 200 | 250 | 275 |
| | 9 | 11 | 12 | 13 | 14 | 15 | 15 | 16 |

FIG. 5

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of a larger volume and upgrading of LTE (LTE Rel. 8 and 9), LTE-Advanced (LTE-A such as LTE Rel. 10, 11, 12 and 13) has been specified.

Successor systems of LTE (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) have been also studied.

UpLink (UL) of the existing LTE systems (e.g., LTE Rel. 8 to 13) supports a Discrete Fourier Transform-Spread-Orthogonal Frequency Division Multiplexing (DFT-s-OFDM) waveform. The DFT-spread-OFDM waveform is a single carrier waveform, so that it is possible to prevent an increase in a Peak to Average Power Ratio (PAPR).

CITATION LIST

Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

It is considered for UL of a future radio communication system (e.g., NR) to support the DFT-spread-OFDM waveform that is a single carrier waveform and a Cyclic Prefix-Orthogonal Frequency Division Multiplexing (CP-OFDM) waveform that is a multi-carrier waveform. Hence, it is assumed to perform allocation that applies CP-OFDM to transmission of a DL signal (e.g., DL shared channel) and a UL signal (e.g., UL shared channel).

In addition, the DFT-spared-OFDM waveform can be paraphrased as a UL signal to which DFT spreading (also referred to as DFT preceding) is applied (with DFT-spreading), and the CP-OFDM waveform can be paraphrased as a UL signal to which DFT-spreading is not applied (without DFT-spreading).

The existing LTE system controls allocation in a frequency direction of a DL shared channel in Resource Block Group (RBG) units. Furthermore, the number of PRBs (RBG size) per RBG is fixedly determined according to the number of PRBs (RBs) associated with the system bandwidth.

On the other hand, the future radio communication system is assumed to expand a system bandwidth compared to the existing LTE system, and configure respectively different bandwidths that can be used for communication per UE in the system bandwidth. Furthermore, it is also considered to support allocation of a downlink control channel and a downlink shared channel in the same time domain.

In such a case, when allocation in the frequency direction of the DL shared channel and/or the UL shared channel is controlled similar to the existing system, there is a risk that resources cannot be efficiently allocated between channels or UEs or resource use efficiency lowers.

It is therefore an object of the present invention to provide a user terminal and a radio communication method that can appropriately control resource allocation in a frequency direction in a future radio communication system that expands a system bandwidth.

Solution to Problem

A user terminal according to one aspect of the present invention includes: a reception section that receives downlink control information; and a control section that decides allocation of a DL shared channel and/or a UL shared channel in a Resource Block Group (RBG) unit based on resource allocation information included in the downlink control information, and a plurality of RBG size candidates are defined as a size of the RBG, and the control section selects a specified RBG size from a specified RBG set configured by part of RBG size candidates of the plurality of RBG size candidates based on information notified from a base station, and decides the allocation.

Advantageous Effects of Invention

According to the present invention, it is possible to appropriately control resource allocation in the frequency direction in the future radio communication system that expands the system bandwidth.

BRIEF DESCRIPTION OF DRAWINGS

FIG. 1 is a diagram for explaining a bit size of an RA field per bandwidth and RBG size.

FIGS. 2A and 2B are diagrams illustrating one example of a method for allocating a shared channel according to the present embodiment.

FIG. 4 is a diagram for explaining one example where a specified RBG size is selected for each bandwidth.

FIG. 5 is a diagram for explaining a bit size of an RA field used for contiguous resource allocation.

DESCRIPTION OF EMBODIMENTS

Figure 3:
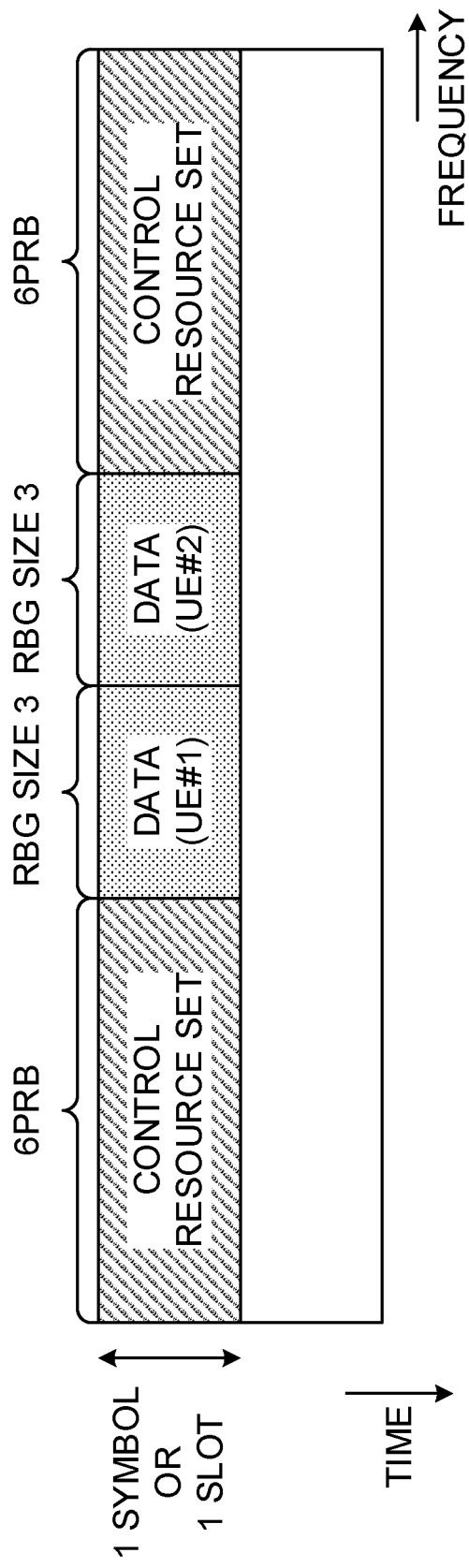
FIG. 3 is a diagram illustrating one example of a method for allocating downlink control channel and a shared channel according to the present embodiment.

It is considered for UL of future radio communication systems (that are, for example, LTE Rel. 14, 15 and subsequent releases such as 5G and NR, and will be also referred to as NR below) support a DFT-spread-OFDM waveform and a CP-OFDM waveform.

A network (e.g., a radio base station (that may be referred to as a radio base station (Base Station (BS)), a transmission/reception point (TRP), an eNode B (eNB) and a gNB)) may configure or indicate to a user terminal (UE: User Equipment) whether or not DFT spreading is applied to a predetermined channel (e.g., an uplink shared channel (PUSCH: Physical Uplink Shared Channel)) (which one of the DFT-spread-OFDM waveform and a CP-OFDM waveform is used).

In addition, a downlink signal and/or a channel (e.g., a downlink shared channel (PDSCH: Physical Downlink Shared Channel)) may be assumed to be transmitted by using a CP-OFDM waveform.

According to existing LTE, the UE detects Downlink Control Information (DCI) transmitted by using a downlink control channel (e.g., Physical Downlink Control Channel (PDCCH)). The UE is instructed based on DCI to receive the PDSCH and transmit a PUSCH.

Allocation of frequency resources to be scheduled is indicated by a Resource Allocation (RA) field included in the DCI. An existing LTE system employs resource allocation of a Resource Block Group (RBG) level.

In a case of, for example, DownLink Resource Allocation Type (DL RA Type 0) that is supported by existing LTE systems, one or a plurality of Physical Resource Blocks (PRB) define an RBG and allocate resources in RBG units. According to existing LTE, an RBG size (the number of PRBs per RBG) is fixedly determined based on a system band (or the number of PRBs determined by a system band), and can take an integer value of 1 to 4.

The UE decides that a size (the number of bits) of a Resource Allocation (RA) field included in downlink control information according to the system band (RBG size), and decides a frequency resource to be scheduled.

By the way, according to NR, it is considered to allocate frequency resources of a CP-OFDM waveform by making a notification based on DL RA Type 0 supported by LTE.

However, unlike existing LTE, according to NR, all UEs are not necessarily able to perform communication in bandwidths matching a system bandwidth. There is also assumed a situation that, while, for example, a UE 1 can perform communication in the system bandwidth by using a specified carrier, a UE 2 cannot perform communication in 40% of the system bandwidth in the same carrier.

In this case, when a common RBG size is applied to each UE similar to the existing systems, it is difficult to perform flexible allocation matching the bandwidth. On the other hand, when the RBG size is determined based on the system bandwidth that is available (accessible) for each UE, different RBG sizes are applied between UEs. In this case, there is a risk that resources of a shared channel (data channel) of UEs that use different RBG sizes cannot be efficiently arranged (subjected to Frequency Division Multiplexing (FDM) without a gap).

Furthermore, according to NR, it is considered to allocate a downlink control channel in a specified frequency domain (and time domain) instead of allocating a downlink control channel to the entire system band. The radio resources including the specified frequency domain and time domain (e.g., one OFDM symbol two OFDM symbols) configured to the UE are also referred to as a COntrol Resource SEt (CORESET), a management resource set, a control subband, a search space set, a search space resource set, a control domain, a control subband or an NR-PDCCH domain.

The control resource set is configured in predetermined resource units, and can be configured to a system bandwidth (carrier bandwidth) or a maximum bandwidth or less that the user terminal can perform reception processing on. For example, the control resource set can include a plurality of RBs (PRBs and/or VRBs) in a frequency direction. In this regard, the RB means a frequency resource block unit including, for example, 12 subcarriers. The UE can monitor downlink control information within a range of the control resource set, and control reception. Consequently, the UE does not need to monitor the entire system bandwidth at all times during reception processing of the downlink control information and consequently can reduce consumption power.

It is considered to introduce the control resource set to use a frequency domain to which a downlink control channel is not allocated to transmit another signal (e.g., shared channel). More specifically, it is also considered to support allocation of a downlink control channel (PDCCH) and a downlink shared channel (PDSCH) to different frequency domains of the same time domain (e.g., the same symbol and/or slot). In this case, from a viewpoint of improvement of resource use efficiency, it is necessary to appropriately control resource allocation of the PDCCH and the PDSCH.

By the way, at least a multiple of six PRBs is considered as a resource allocation granularity of a control channel, and furthermore one of two PRBs and three PRBs is likely to be employed. On the other hand, it is considered to use perfect power of two as the RBG size used for scheduling, and is likely to mismatch with the resource allocation granularity of the control channel.

Thus, a method for efficiently arranging (i.e., performing frequency division multiplexing without a gap) resources of the shared channels and/or resources of the shared channel and the control channel when the CP-OFDM waveform is used is not yet considered. Unless this method is considered, there is a risk of a decrease in frequency use efficiency.

Hence, the inventors of the invention have focused on being able to efficiently arrange resources of items of different UE data and/or different channels by selecting and applying RBG sizes having a predetermined relationship to a signal (channel) to be allocated to the same time domain. Furthermore, the inventors of the invention have focused on selecting the RBG size to be allocated to each signal according to a predetermined condition and controlling allocation when different RBG sizes are applied to signals to be allocated to the same time resource.

More specifically, according to one aspect of the present invention, a plurality of RBG size candidates that are RBG sizes that are allocation (or scheduling) units of a DL shared channel and/or a UL shared channel are defined, and a specified(given) RBG size is selected from an RBG set configured by part of RBG size candidates of a plurality of RBG size candidates to control allocation of a shared channel.

For example, an RBG set having a high affinity with a resource allocation granularity of a predetermined channel (e.g., control channel) and another RBG set including RBGs different from those of the RBG set are defined. The UE selects the specified RBG set and/or RBG sizes based on information from the base station, and decides a size of an RA field included in downlink control information.

Embodiments according to the present invention will be described in detail with reference to the drawings. The radio communication method according to each embodiment may be applied alone or may be applied in combination. In addition, in the following embodiments, optional signals and channels may be assigned a prefix "NR-" indicating use for NR and be read as the signals and the channels for NR.

First Embodiment

The first embodiment will describe a configuration where an RBG set (also referred to as an RBG size set, an RBG size group or an RBG group) configured by specified RBG size candidates is defined to control resource allocation.

FIG. 1 is a diagram illustrating a relationship between the numbers of PRBs (system bandwidths) of a specified carrier, RBG sizes and the numbers of bits of an RA field of downlink control information. In this regard, FIG. 1 illustrates the number of bits of the RA field in a case where the numbers of PRBs are respectively 25, 50, 75, 100, 150, 200, 250 and 275 and the RBG sizes are respectively 2, 3, 4, 6, 8, 12 and 16. Naturally, the applicable numbers of PRBs and RBG sizes are not limited to these.

A base station applies a bitmap resource allocation method in RBG units (RBG levels), and controls allocation of a DL shared channel and/or a UL shared channel (referred to as a "shared channel" below). Furthermore, a user terminal selects a specified RBG size from the RBG set including a plurality of RBG size candidates based on information notified from the base station, and decides resource allocation of the shared channel.

Selection of the RBG size in a case where shared channels of a plurality of UEs (e.g., UEs of different access bandwidths) are allocated to the same time domain (type 1) and a case where a PDCCH and a PDSCH to which a specified RBG size is applied are allocated to the same time domain (type 2) will be described. The time domain may be one or a plurality of symbols or may be a predetermined time unit (e.g., a slot or a mini slot).

<Type 1>

The base station selects a specified RBG size from the RBG set including a plurality of RBG size candidates and controls allocation of the shared channel of each UE. Each RBG set only needs to include an RBG size candidate having a high affinity from a viewpoint of a resource allocation granularity. For example, the first RBG set is configured by RBG size candidates of {2, 4, 8, 16}. {2, 4, 8, 16} have a mutually nested relationship, and therefore even when a plurality of UEs use different RBG sizes included in the same RBG set, it is possible to align and arrange (perform FDM on) the shared channels efficiently (without a gap).

FIG. 2A illustrates that the RBG size selected from the RBG size candidates {2, 4, 8, 16} included in the first RBG set is used to allocate data (a DL shared channel and/or a UL shared channel). The base station performs scheduling by applying one of RBG sizes included in the first RBG set when scheduling data of a plurality of UEs in the same time domain. The RBG size applied to data of each UE only needs to be determined based on an available bandwidth of each UE, a communication bandwidth configured to each UE or higher layer signaling for configuring the RBG size.

This is a case where the RBG size 4 is applied to a UE #1, the RBG size 2 is applied to a UE #2 and the RBG size 8 is applied to a UE #3. Consequently, even when a plurality of UEs use different RBG sizes, the RBG sizes have the mutually nested relationship, so that it is possible to align and arrange (perform FDM on) shared channels efficiently (without a gap). In addition, different RBG sizes may be applied to data to be non-contiguously allocated to a certain UE.

Furthermore, the second RBG set may include RBG size candidates of {3, 6, 12}. {3, 6, 12} have a mutually nested relationship, so that, even when a plurality of UEs use different RBG sizes included in the same RBG set, it is possible to efficiently align and arrange shared channels.

FIG. 2B illustrates that an RBG size selected from the RBG size candidates {3, 6, 12} included in the second RBG set is used to allocate data (the DL shared channel and/or the UL shared channel). The base station performs scheduling by applying one of RBG sizes included in the second RBG set when scheduling data of a plurality of UEs in the same time domain.

This is a case where the RBG size 3 is applied to the UE #1, the RBG size 6 is applied to the UE #2 and the RBG size 6 is applied to the UE #3. Consequently, when a plurality of UEs use different RBG sizes, the RBG sizes have the mutually nested relationship, so that it is possible to efficiently align and arrange the shared channels. In addition, different RBG sizes may be applied to data to be non-contiguously allocated to a certain UE.

FIG. 2 illustrates that the first RBG set includes RBG sizes that are exponentials of two and the second RBG set includes RBG sizes that are X* (exponentials of two) (e.g., X=3). However, RBG size candidates that configure the RBG set are not limited to this.

Furthermore, part of the RBG size candidates that compose the first RBG set and part of the RBG size candidates that compose the second RBG set may overlap. For example, the first RBG set may include the RBG size candidates of {2, 4, 8, 16}, and the second RBG set may include RBG size candidates of {2, 3, 6} or {2, 3, 6, 12}.

When, for example, the shared channels are allocated to the same time domain and when RBG sizes having a low affinity are selected for a plurality of UEs (e.g., the RBG size 6 is selected for one UE and the RBG size 8 is selected for the other UE), it is difficult perform FDM on the shared channels efficiently (without a gap). On the other hand, by using the RBG sizes included in the same RBG set, a plurality of UEs (e.g., UEs of different accessible bandwidths) can efficiently perform FDM on the shared channels even when the UEs apply different RBG sizes. As a result, it is possible to prevent a decrease in resource use efficiency.

The UE determines information related to the RBG sizes and/or the RBG set to be applied based on predetermined information (e.g., information notified from the base station). For example, the UE may decide the RBG size and/or the RBG set based on the system bandwidth (or the number of PRBs (NRB) that compose the system bandwidth). Alternatively, the UE may decide the RBG size and/or the RBG set based on at least one of system information notified from the base station, higher layer signaling (e.g., RRC signaling), MAC signaling and L1 signaling.

The system bandwidth (or the number of RBs (NRB) that compose the system bandwidth) may be a value determined based on the system information or may be a value notified by higher layer signaling.

The base station only needs to make a notification of the RBG sizes included in the same RBG set to a plurality of UEs for which the shared channels are scheduled in a predetermined time domain. The UE may decide the number of PRBs that compose the system bandwidth, and the number of bits of an RA field included in downlink control information based on the RBG sizes.

The base station may configure one RBG set in advance to the UE by higher layer signaling, or may configure a plurality of RBG sets. When one or a plurality of RBG sets are configured, the base station may notify the UE of information related to the RBG sizes used to allocate the shared channels by using at least one of system information, RRC signaling, MAC signaling and downlink control information.

In addition, as illustrated in FIG. 1, when the number of PRBs is larger and the RBG size is smaller, the number of bits in a resource allocation field is larger. When the number of bits in the resource allocation field is larger, while resource allocation can be finely controlled, an overhead of the downlink control information is large. Hence, an RBG size whose number of bits in the resource allocation field is a predetermined value or less may be configured to be applied to each number of PRBs (an RBG size whose number of bits is larger than a predetermined value is restricted). The predetermined value of the number of bits may be, for example, 25.

<Type 2>

The base station selects a specified RBG size from the RBG set including a plurality of RBG size candidates, and controls allocation of a downlink control channel and a shared channel. Each RBG set only needs to include RBG size candidates having a high affinity from a viewpoint of a resource allocation granularity. Furthermore, each RBG set includes RBG size candidates having a high affinity with a resource allocation granularity of the downlink control channel.

In this regard, it is considered that a CCE size of the downlink control channel is configured by six Resource Element Groups (REG). One REG corresponds to one PRB of one OFDM. In this case, the CCE (the resource allocation granularity of the PDCCH) of the downlink control channel is a multiple of six PRBs. Hence, it is preferable to select the RBG size candidates of the RBG set to include the allocation granularity (six in this case) of the downlink control channel. For example, the RBG set applied to the shared channel to be allocated to the same time domain as that of the downlink control channel only needs to include the RBG size candidates of {3, 6, 12}.

{3, 6, 12} have the mutually nested relationship, so that, even when a plurality of UEs use different RBG sizes included in the same RBG set, it is possible to efficiently align and perform FDM on the shared channel and the downlink control channel. In addition, the allocation granularity of the downlink control channel is not limited to this.

FIG. 3 illustrates one example of a case where data (DL shared channel) is allocated to the time domain to which the downlink control channel (or the control resource set) is allocated. In this regard, the downlink control channel is allocated based on a multiple of the six PRBs, and therefore FIG. 3 illustrates a case where an RBG size selected from the RBG size candidates {3, 6, 12} included in the second RBG is applied to DL data.

The base station performs scheduling by applying one of RBG sizes included in the second RBG set to DL data when scheduling the downlink control channel and the DL data in the same time domain. The RBG size applied to each DL data may be determined based on an available bandwidth of a corresponding UE, a communication bandwidth configured to each UE or higher layer signaling for configuring the RBG size.

This is a case where the downlink control channel (or the control resource set) is configured based on the six PRBs, the RBG size 3 is applied to the UE #1 and the RBG size 3 is applied to the UE #2. Consequently, even when the downlink control channel and the data are allocated to the same time domain, allocation units of the downlink control channel and the data have the mutually nested relationship, so that it is possible to efficiently align and perform FDM on the downlink control channel and the data.

In addition, the case where the RBG set is configured by the RBG size candidates of {3, 6, 12} has been described. However, the RBG sizes are not limited to these. For example, the RBG size candidates that configure the RBG set may be changed according to a mapping method of the downlink control channel.

More specifically, an REG mapping unit of the PDCCH differs between a case where the CCE of the downlink control channel is mapped locally (non-interleaved) and a case where the CCE is mapped in a distributed manner (interleaved). When the CCE is mapped in the distributed manner, the REG mapping unit is two, three or six. When the REG mapping unit is two, the RBG set may include the RBG size candidates of {2, 4, 8, 16}. On the other hand, when the CCE is mapped locally (non-interleaved), the REG mapping unit is six, and therefore the RBG set only needs to include the RBG size candidates of {3, 6, 12}.

Thus, by defining the RBG set by using RBG size candidates satisfying predetermined conditions (having, for example, the mutually nested relationship), and selecting the RBG sizes of the shared channels to be allocated to the same time domain from the same RBG set, it is possible to improve resource use efficiency.

<Method for Determining Specified RBG Size>

As described above, the base station may configure one or more RBG sets in advance to the UE by a system bandwidth and/or higher layer signaling. When one or a plurality of RBG sets are configured, the base station only needs to notify the UE of information related to the RBG sizes used for scheduling the shared channel by using at least one of system information, RRC signaling, MAC signaling and downlink control information.

For example, one RBG size candidate may be selected (indicated to the UE) from each of a plurality of RBG sets, and the UE may decide a specified RBG size to be applied to the shared channel based on information notified from the base station. A case where one RBG size candidate is selected from each of the first RBG set and the second RBG set based on the system bandwidth (the number of PRBs), and the specified RBG size is determined based on the downlink control information will be described below.

FIG. 4 illustrates one example of a table illustrating an association between system bandwidths (the numbers of PRBs), RBG sizes and bit information of an RA field of downlink control information. The table in FIG. 4 illustrates a case where an RBG size is restricted to select one RBG size from each of the RBG size candidates {2, 4, 8, 16} of the first RBG set and the RBG size candidates {3, 6, 12} of the second RBG set for each number of PRBs. The RBG size selected (or restricted) for each PRB is not limited to this.

The UE selects one RBG candidate included in each RBG set based on the system bandwidth (the number of PRBs). Information related to the number of PRBs can be obtained from higher layer signaling and/or system information notified from the base station. When, for example, the number of PRBs is 100, the UE selects the RBG size 4 included in the first RBG set and the RBG size 6 included in the second RBG set. Furthermore, when the number of PRBs is 200, the UE selects the RBG size 8 included in the first RBG set, and the RBG size 12 included in the second RBG set.

Subsequently, the UE monitors downlink control information (DCI format) associated with each RBG size, and determines the RBG size according to the detected DCI format. The UE controls reception of the DL shared channel and/or transmission of the UL shared channel assuming that the determined RBG size is applied to the shared channel.

The UE may decide which one of the RBG sizes the DCI format is associated with based on a payload size. When, for example, the payload of the DCI is larger than a predetermined value, an RBG size having a larger number of bits is selected and, when the payload of the DCI is less than the predetermined value, an RBG size having a smaller number of bits is selected.

Alternatively, the UE may decide which one of RBG sizes the DCI format is associated with based on a search space to which the DCI is allocated and/or a COntrol REsource SET (CORESET). In this case, an association between the DCI format of each RBG size, and the search space and/or the control resource set may be defined in advance by a specification, or may be notified from the base station to the user terminal.

Alternatively, the UE may decide which one of RBG sizes the DCI format is associated with, based on a predetermined bit (e.g., a flag bit) included in the DCI.

Thus, by selecting each RBG size candidate from a different RBG set, and selecting one of RBG size candidates based on downlink control information, it is possible to flexibly change the RBG size, and allocate resources. As a result, it is possible to improve resource use efficiency while flexibly controlling scheduling of the downlink control channel and/or the shared channel.

Second Embodiment

The second embodiment will describe allocation in a frequency direction of a UL shared channel (PUSCH). The above first embodiment has described a case where a CP-OFDM waveform (multi-carrier waveform) is applied to transmit a PUSCH. However, a DFT-s-OFDM waveform (single carrier waveform) may be applied to transmit the PUSCH. When the single carrier waveform is used, one or a plurality of contiguous PRBs are used to transmit the PUSCH.

FIG. 5 is a diagram illustrating a relationship between a bandwidth (the number of PRBs) and the number of bits of a Resource Allocation (RA) field included in downlink control information when the single carrier waveform is applied to the PUSCH. In this regard, contiguous resource allocation is applied to the PUSCH, and a bit size of the RA field is fixedly configured per number of PRBs. Thus, by fixedly defining the bit size of the RA field in advance according to the number of PRBs, blind decoding only needs to be performed on the DCI of the fixed payload during blind detection control of the user terminal, so that it is possible to reduce a burden of the terminal.

Third Embodiment

The third embodiment will describe a case where a plurality of DCIs (DCI formats) are used to control resource allocation of a shared channel.

According to NR, frequency resources of a CP-OFDM waveform are desirably allocated by dynamically switching between large resource allocation and small resource allocation. For example, a case where, after an entire (or substantially entire) system band is scheduled in a predetermined slot, one or a small number of PRBs are scheduled in a next slot is also preferably supported.

When only bitmap resource allocation in RBG units (RBG levels) is supported for the shared channel to which the CP-OFDM waveform is applied, it is difficult to widen a resource allocation dynamic range (e.g., allocate one or a number of PRBs from the entire bandwidth). When, for example, the number of PRBs of the system bandwidth is 275, and the number of bits of the RA field is a predetermined value (e.g., 25 or less), 12 and/or 16 is selected for an RBG size. Hence, it is difficult to control allocation in one or several PRB units.

Hence, according to the third embodiment, a UE monitors a plurality of DCI formats to which different resource allocation types and/or different RBG sizes are respectively configured. For example, the UE monitors the DCI format including the RA field for which a bitmap of the RBG level is defined, and, in addition, a DCI format including the RA field used to indicate contiguous resource allocation. The RA field used to indicate the contiguous resource allocation may employ the same configuration as the RA field used for a DFT-s-OFDM waveform.

In this case, the UE only needs to monitor a plurality of DCI formats of different payload sizes. The DCI formats of the different payload sizes may be configured to be respectively transmitted by different control resource sets. Furthermore, the number of PDCCH candidates monitored by the UE may be configured per control resource set.

By transmitting DCI formats of different payload sizes in different control resource sets, the UE only needs to selectively monitor a DCI format of a predetermined payload size per control resource set. Consequently, by controlling the number of PDCCH candidates that need to be monitored by the UE per control resource set, it is possible to suppress an increase in the number of times of blind decoding of the UE.

Thus, by controlling allocation of the shared channel by using the DCI including the RA field for indicating different resource allocation (e.g., resource allocation in different RBG units or contiguous resource allocation) separately from the DCI including the RA field indicating resource allocation in the RBG units, it is possible to flexibly control resource allocation even in a case of a wide bandwidth (the number of PRBs).

(Radio Communication System)

The configuration of the radio communication system according to one embodiment of the present invention will be described below. This radio communication system uses one or a combination of the radio communication methods according to each of the above embodiments of the present invention to perform communication.

Figure 6:
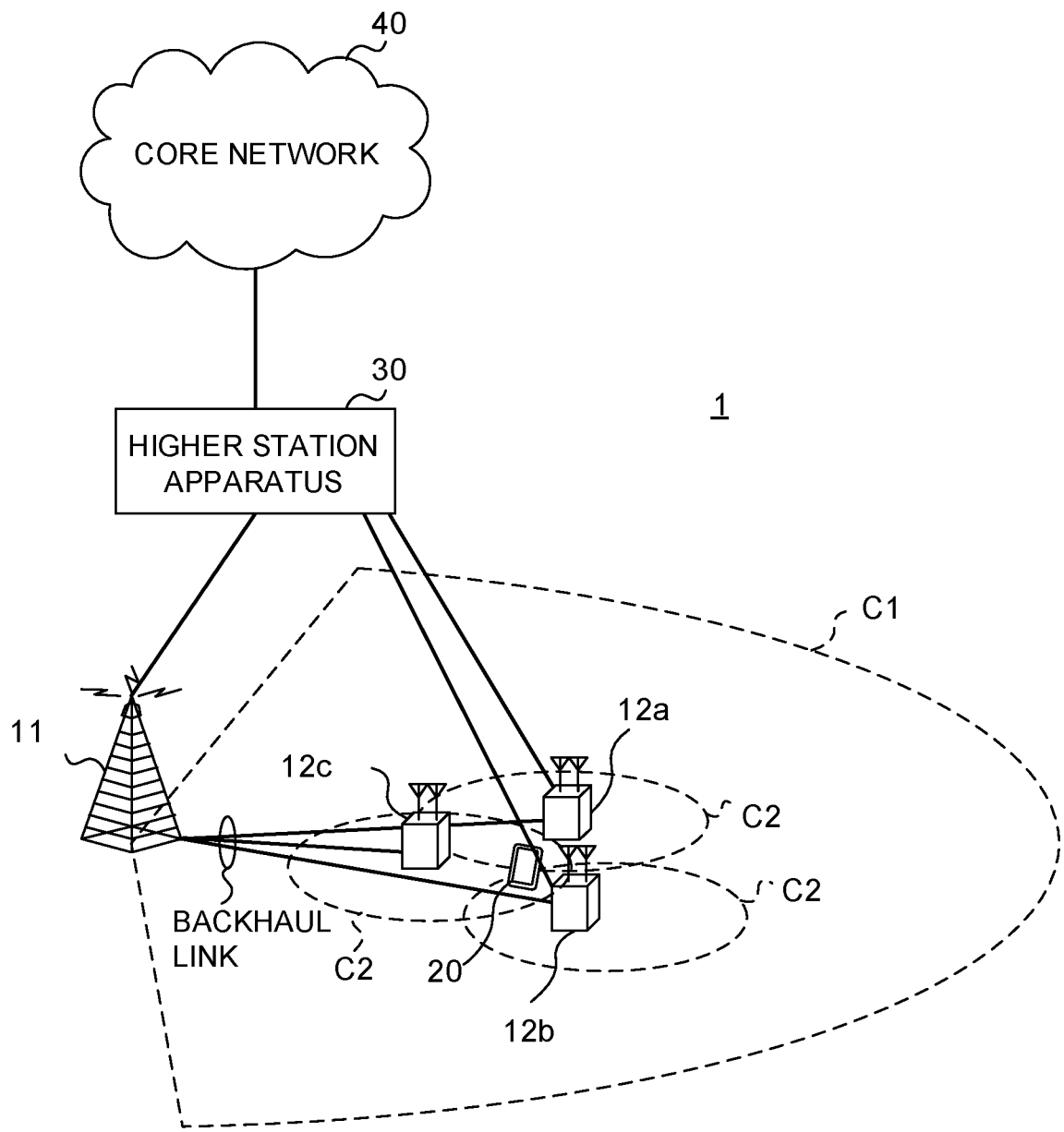
FIG. 6 is a diagram illustrating one example of a schematic configuration of a radio communication system according to one embodiment of the present invention.

FIG. 6 is a diagram illustrating one example of a schematic configuration of the radio communication system according to the one embodiment of the present invention. A radio communication system 1 can apply Carrier Aggregation (CA) that aggregates a plurality of base frequency blocks (component carriers) whose one unit is a system bandwidth (e.g., 20 MHz) of the LTE system, and/or Dual Connectivity (DC).

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the number of each cell and the user terminal 20 are not limited to the aspect illustrated in FIG. 6.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (an existing carrier that is also referred to as a Legacy carrier) of a narrow bandwidth in a relatively low frequency band (e.g., 2 GHz). Meanwhile, the user terminal 20 and each radio base station 12 may use a carrier of a wide bandwidth in a relatively high frequency band (e.g., 3.5 GHz or 5 GHz) or may use the same carrier as that used by the radio base station 11. In this regard, a configuration of the frequency band used by each radio base station is not limited to this.

Furthermore, the user terminal 20 can perform communication in each cell by using Time Division Duplex (TDD) and/or Frequency Division Duplex (FDD). Furthermore, each cell (carrier) may be applied a single numerology or may be applied a plurality of different numerologies.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are respectively connected with a higher station apparatus 30 and are connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) and/or OFDMA to uplink as radio access schemes.

OFDMA is a multi-carrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use different bands to reduce an interference between the terminals. In this regard, uplink and downlink radio access schemes are not limited to a combination of these and may be other radio access schemes.

The radio communication system 1 uses as downlink channels a downlink shared channel (PDSCH: Physical Downlink Shared Channel) shared by each user terminal 20, a broadcast channel (PBCH: Physical Broadcast Channel) and a downlink L1/L2 control channel. User data, higher layer control information and System Information Blocks (SIB) are transmitted on the PDSCH. Furthermore, Master Information Blocks (MIB) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is transmitted on the PDCCH.

In addition, scheduling information may be notified by DCI. For example, the DCI for scheduling reception of DL data may be referred to as a DL assignment, and the DCI for scheduling transmission of UL data may be referred to as a UL grant.

The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses as uplink channels an uplink shared channel (PUSCH: Physical Uplink Shared Channel) shared by each user terminal 20, an uplink control channel (PUCCH: Physical Uplink Control Channel), and a random access channel (PRACH: Physical Random Access Channel). User data and higher layer control information are transmitted on the PUSCH. Furthermore, downlink radio quality information (CQI: Channel Quality Indicator), transmission acknowledgement information and a Scheduling Request (SR) are transmitted on the PUCCH. A random access preamble for establishing connection with cells is transmitted on the PRACH.

The radio communication system 1 transmits as downlink reference signals a Cell-specific Reference Signal (CRS), a Channel State Information-Reference Signal (CSI-RS), a DeModulation Reference Signal (DMRS) and a Positioning Reference Signal (PRS). Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

Figure 7:
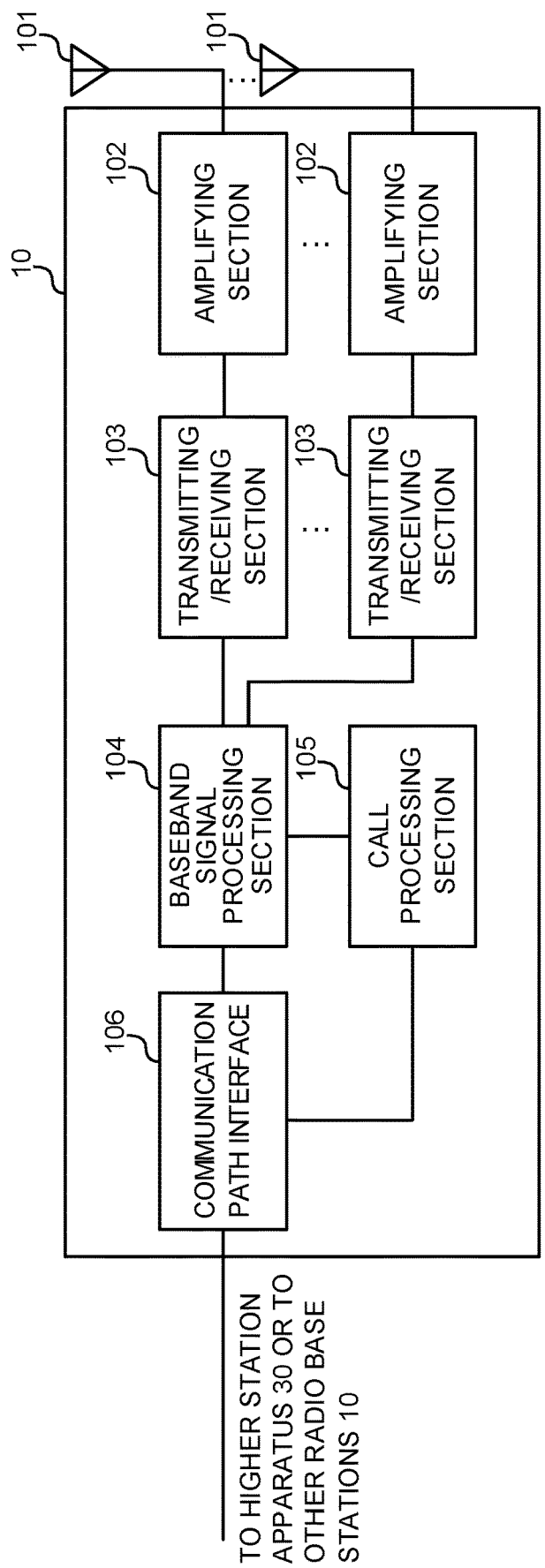
FIG. 7 is a diagram illustrating one example of an entire configuration of a radio base station according to the one embodiment of the present invention.

(Radio Base Station) FIG. 7 is a diagram illustrating one example of an entire configuration of the radio base station according to the one embodiment of the present invention.

The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the user data to transfer to each transmission/reception section 103. Furthermore, the baseband signal processing section 104 performs transmission processing such as channel coding and inverse fast Fourier transform on a downlink control signal, too, to transfer to each transmission/reception section 103.

Each transmission/reception section 103 converts a baseband signal precoded and output per antenna from the baseband signal processing section 104 into a radio frequency band to transmit. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal to output to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal to transfer to the higher station apparatus 30 via the channel interface 106. The call processing section 105 performs call processing (configuration and release) of a communication channel, state management of the radio base station 10, and radio resource management.

The channel interface 106 transmits and receives signals to and from the higher station apparatus 30 via a predetermined interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmission/reception section 103 transmits DL data (DL shared channel) and downlink control information (PDCCH) allocated to resources in predetermined transmission units (e.g., RBG units). Furthermore, each transmission/reception section 103 receives UL data (UL shared channel) allocated to resources in predetermined transmission units (e.g., RBG units). Furthermore, each transmission/reception section 103 transmits information for making the UE identify the RBG size. For example, each transmission/reception section 103 transmits information ($N_{RB}^{UL}$ and/or $N_{RB}^{DL}$) related to system bands of UL and/or DL and information indicating the RBG size by using at least one of system information, higher layer signaling (e.g., RRC signaling), MAC signaling and L1 signaling.

Figure 8:
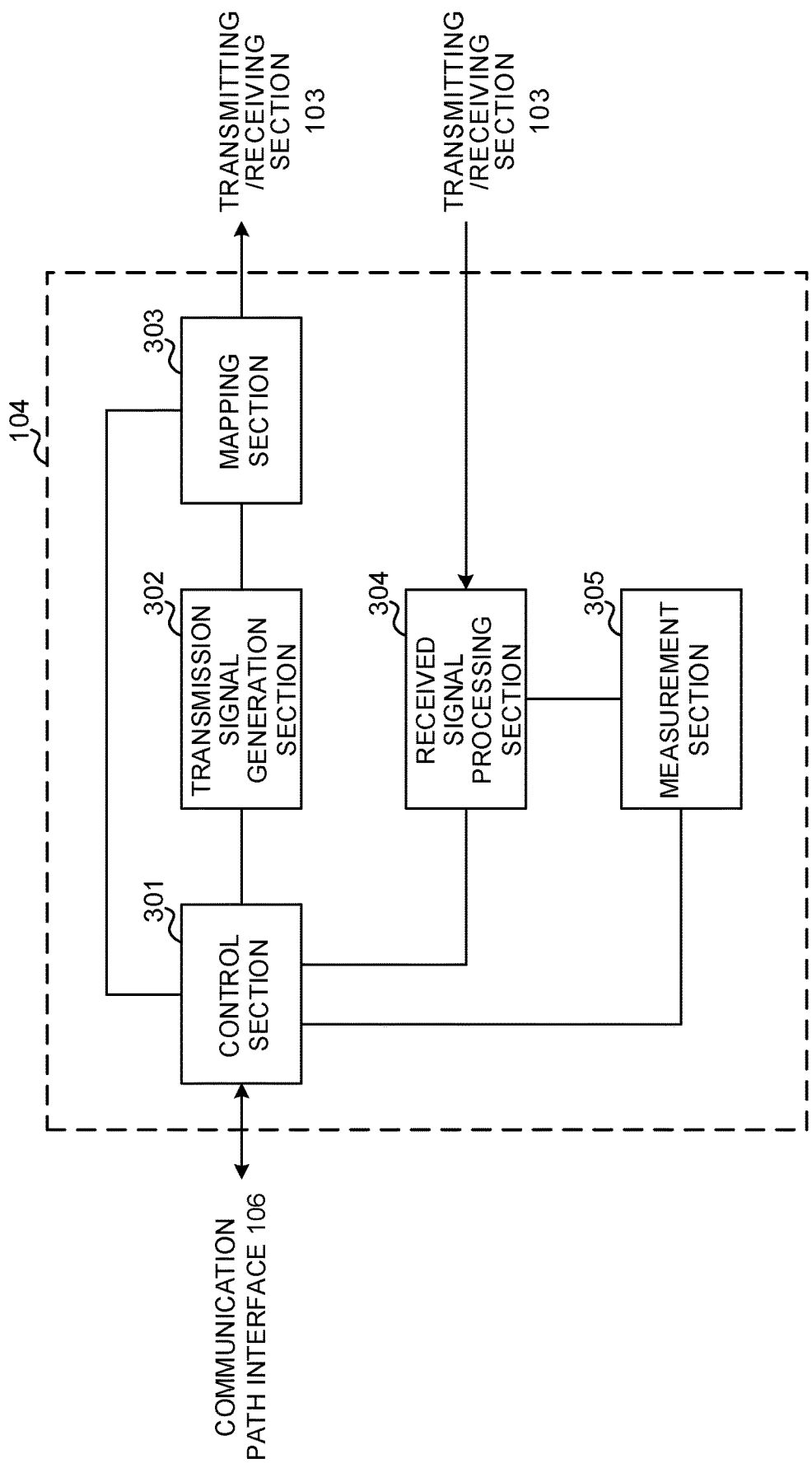
FIG. 8 is a diagram illustrating one example of a function configuration of the radio base station according to the one embodiment of the present invention.

FIG. 8 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks that are necessary for radio communication, too.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components do not necessarily need to be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal transmitted on the PDCCH and/or the EPDCCH such as transmission acknowledgement information). Furthermore, the control section 301 controls generation of the downlink control signal and the downlink data signal based on a result obtained by deciding whether or not it is necessary to perform retransmission control on the uplink data signal. Furthermore, the control section 301 controls scheduling of a synchronization signal (e.g., a Primary Synchronization Signal (PSS)/a Secondary Synchronization Signal (SSS)), and a downlink reference signal (e.g., a CRS, a CSI-RS and a DMRS).

Furthermore, the control section 301 controls scheduling of an uplink data signal (e.g., a signal transmitted on the PUSCH), an uplink control signal (e.g., a signal transmitted on the PUCCH and/or the PUSCH such as transmission acknowledgement information), a random access preamble (e.g., a signal transmitted on the PRACH) and an uplink reference signal.

The control section 301 applies one of RBG size candidates included in the same RBG set (RBG group) to a plurality of shared channels to be allocated in the same time domain to control allocation (scheduling). Furthermore, the downlink control channel and the downlink shared channel are scheduled in the same time domain, a specified RBG size is applied from RBG set including the RBG size candidates that take an allocation granularity of the downlink control channel into account to control allocation of the downlink shared channel.

The transmission signal generating section 302 generates downlink signals (such as a downlink control signal, a downlink data signal and a downlink reference signal) based on an instruction from the control section 301 to output to the mapping section 303. The transmission signal generating section 302 can be composed of a signal generator, a signal generating circuit and a signal generating apparatus described based on the common knowledge in the technical field according to the present invention.

The transmission signal generating section 302 generates, for example, a DL assignment for notifying downlink signal allocation information, and/or a UL grant for notifying uplink data allocation information based on the instruction from the control section 301. The DL assignment and the UL grant are both DCI and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a predetermined radio resource based on the instruction from the control section 301 to output to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement and Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) and a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 9:
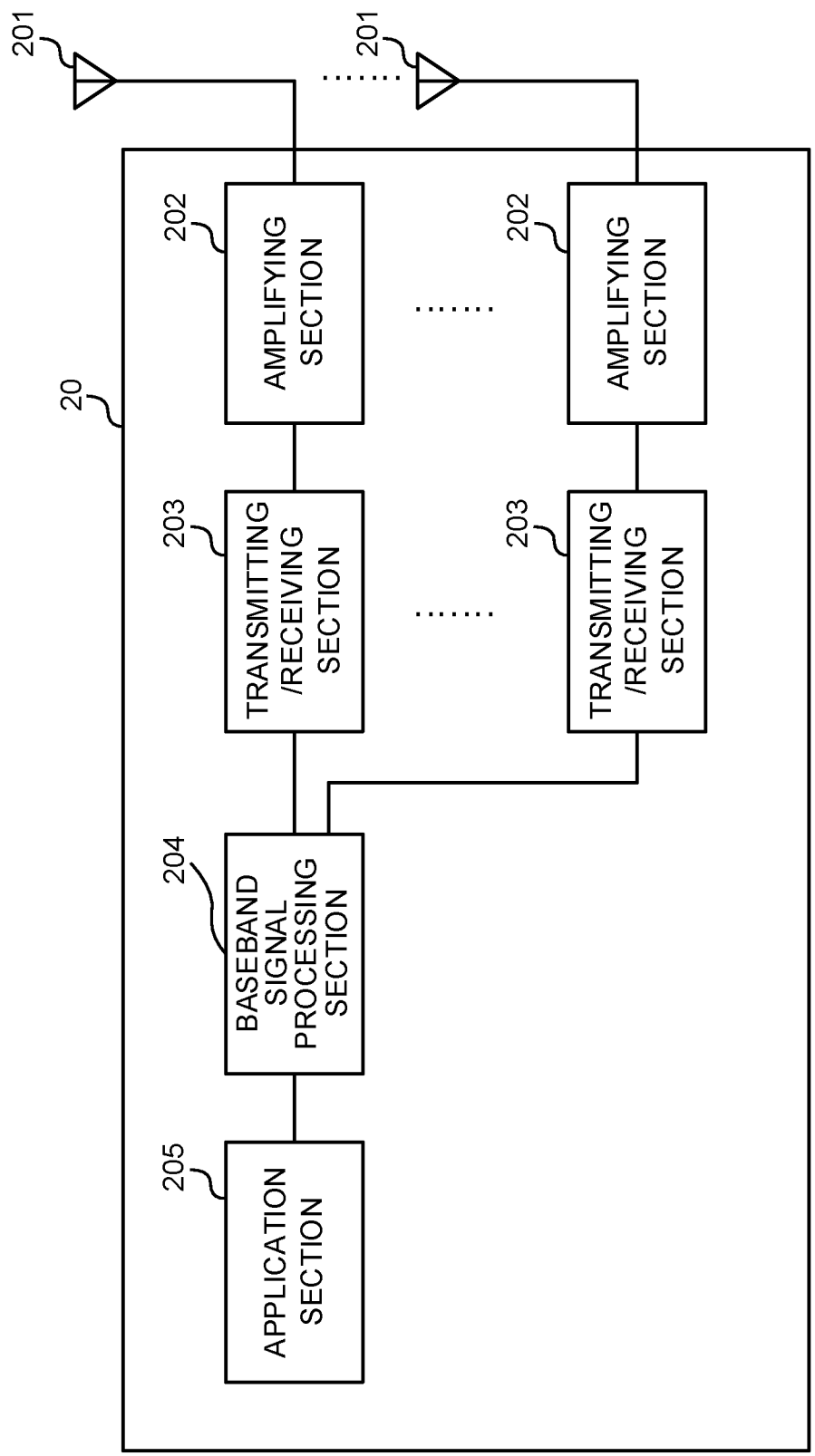
FIG. 9 is a diagram illustrating one example of an entire configuration of a user terminal according to the one embodiment of the present invention.

FIG. 9 is a diagram illustrating one example of an entire configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal to output to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information among the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data to transfer to each transmission/reception section 203. Each transmission/reception section 203 converts the baseband signal output from the baseband signal processing section 204 into a radio frequency band to transmit. The radio frequency signal subjected to the frequency conversion by each transmission/reception section 203 is amplified by each amplifying section 202, and is transmitted from each transmission/reception antenna 201.

Each transmission/reception section 203 receives DL data (DL shared channel) and downlink control information (PDCCH) allocated to resources in predetermined transmission units (e.g., RBG units). Furthermore, each transmission/reception section 203 transmits UL data (UL shared channel) allocated to resources in predetermined transmission units (e.g., RBG units). Furthermore, each transmission/reception unit 203 receives information for deciding an RBG size to be applied to a shared channel. For example, each transmission/reception section 203 receives information ($N_{RB}^{UL}$ and/or $N_{RB}^{DL}$) related to system bands of UL and/or DL, and information indicating an RBG size from at least one of system information, higher layer signaling (e.g., RRC signaling), MAC signaling and L1 signaling.

Figure 10:
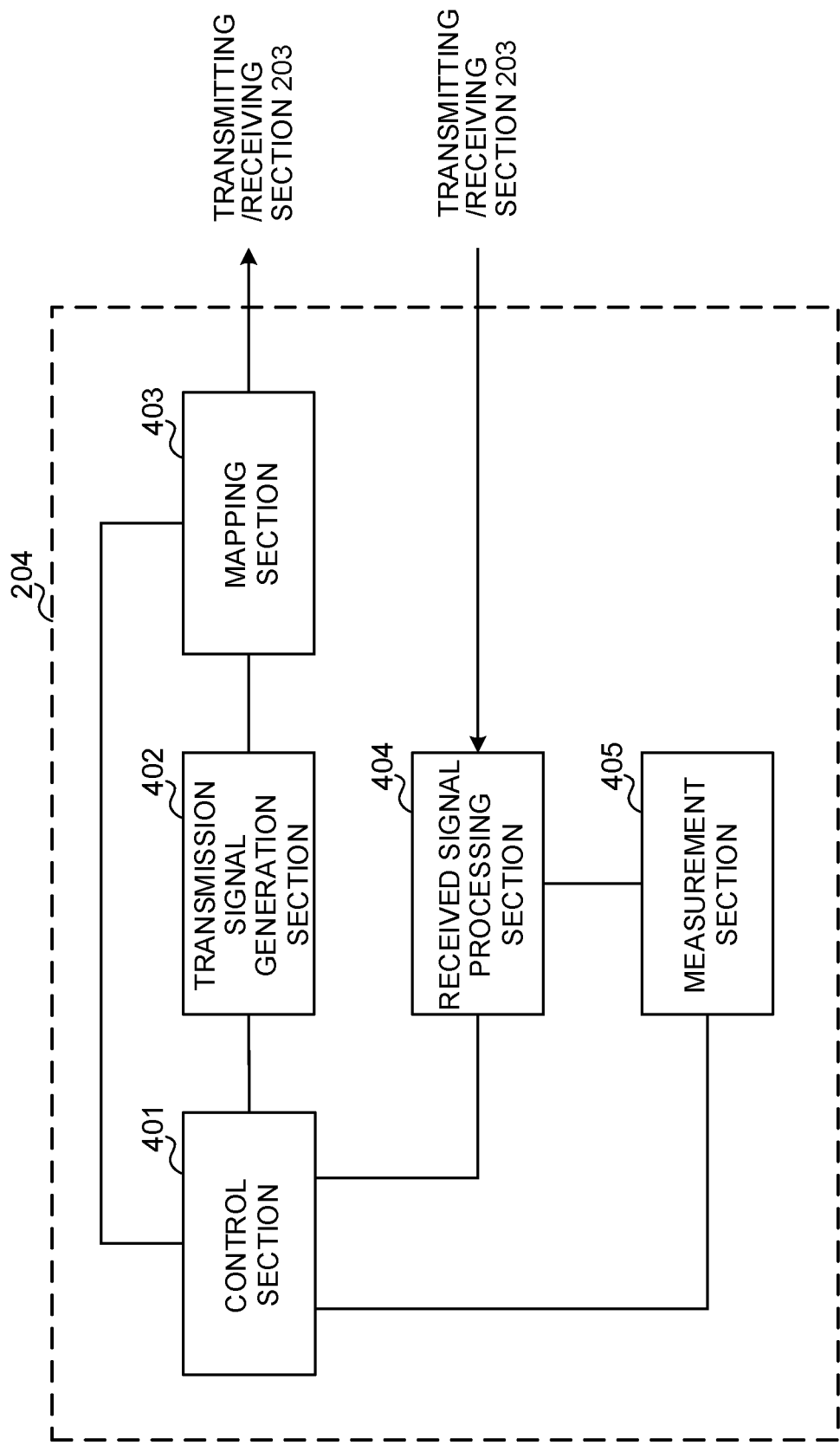
FIG. 10 is a diagram illustrating one example of a function configuration of the user terminal according to the one embodiment of the present invention.

FIG. 10 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks that are necessary for radio communication, too.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components do not necessarily need to be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains, from the received signal processing section 404, a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 decides allocation of the DL shared channel and/or the UL shared channel in Resource Block Group (RBG) units based on the resource allocation information included in the downlink control information. Furthermore, when a plurality of RBG size candidates are defined as RBG sizes, the control section 401 selects a specified RBG size from a specified(given) set including part of RBG size candidates of a plurality of RBG size candidates based on information notified from the base station, and decides allocation of the shared channel.

Furthermore, the control section 401 may decide the number of bits of resource allocation information included in downlink control information based on the specified RBG size and the system bandwidth.

The specified set may be the first set including at least an RBG size candidate that is at least one of {2, 4, 8, 16} and/or the second set including at least an RBG size candidate that is at least one of {3, 6, 12}. The control section 401 selects at least one RBG size candidate from each of the first set and the second set based on the information notified from the base station, and controls monitoring of downlink control information associated with each RBG size candidate. The control section 401 may assume that one of RBG size candidates included in the second set is applied to allocation of the DL shared channel to be allocated to the same time domain as that of the downlink control information.

The transmission signal generating section 402 generates an uplink signal (such as an uplink control signal, an uplink data signal and an uplink reference signal) based on an instruction from the control section 401 to output to the mapping section 403. The transmission signal generating section 402 can be composed of a signal generator, a signal generating circuit and a signal generating apparatus described based on the common knowledge in the technical field according to the present invention.

For example, the transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the control section 401 instructs the transmission signal generating section 402 to generate an uplink data signal.

The mapping section 403 maps the uplink signal generated by the transmission signal generating section 402, on a radio resource based on the instruction from the control section 401 to output to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (a downlink control signal, a downlink data signal and a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ, an SINR and an SNR), a signal strength (e.g., RSSI) and channel information (e.g., CSI). The measurement section 405 may output a measurement result to the control section 401.

(Hardware Configuration)

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by one physically and/or logically coupled apparatus or may be realized by a plurality of apparatuses formed by connecting two or more physically and/or logically separate apparatuses directly and/or indirectly (by way of, for example, wired connection or radio connection).

Figure 11:
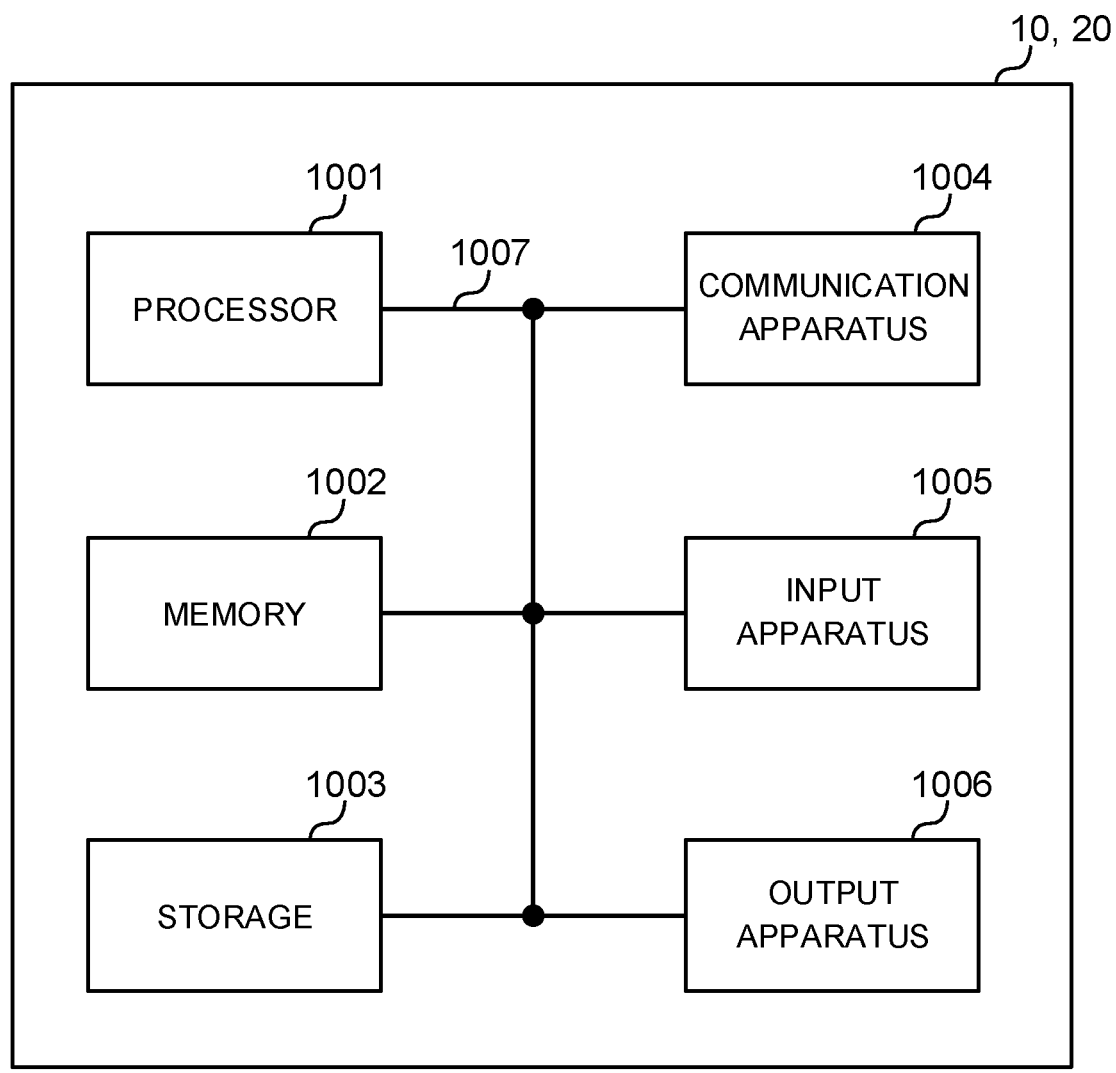
FIG. 11 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 11 is a diagram illustrating one example of hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 11 or may be configured without including part of the apparatuses.

For example, FIG. 11 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an arithmetic operation, and control communication performed via the communication apparatus 1004 and reading and/or writing of data in the memory 1002 and the storage 1003.

For example, the processor 1001 causes an operating system to operate to control the entire computer. The processor 1001 may be composed of a Central Processing Unit (CPU) including an interface for a peripheral apparatus, a control apparatus, an arithmetic operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to the programs, the software module or the data. As the programs, programs that cause the computer to execute at least part of the operations described in the above embodiments are used. For example, the control section 401 of the user terminal 20 may be realized by a control program stored in the memory 1002 and operating on the processor 1001 or other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by at least one of these types of hardware.

Modified Example

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., 1 ms) that does not depend on the numerology.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology. Furthermore, the slot may include a plurality of mini slots. Each mini slot may include one or a plurality of symbols in the time domain. Furthermore, the mini slot may be referred to as a subslot.

All of the radio frame, the subframe, the slot, the mini slot and the symbol indicate time units for transmitting signals. The other corresponding names of the radio frame, the subframe, the slot, the mini slot and the symbol may be used. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (1 ms) according to existing LTE, may be a period (e.g., 1 to 13 symbols) shorter than 1 ms or may be a period longer than 1 ms. In addition, a unit that represents the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a data packet (transport block) subjected to channel coding, a code block and/or a codeword or may be a processing unit of scheduling or link adaptation. In addition, when the TTI is given, a time period (e.g., the number of symbols) on which the transport block, the code block and/or the codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., reduced TTI) may be read as a TTI having the TTI length less than the TTI length of the long TTI or equal to or more than 1 ms.

Resource Blocks (RBs) are resource block allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in this description may be expressed by using absolute values, may be expressed by using relative values with respect to predetermined values or may be expressed by using other corresponding information. For example, a radio resource may be indicated by a predetermined index.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspect/embodiment described in this description, and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRC Connection Setup message or an RRC Connection Reconfiguration message. Furthermore, the MAC signaling may be notified by using, for example, an MAC Control Element (MAC CE).

Furthermore, notification of predetermined information (e.g., notification of "being X") may be made not only explicitly but also implicitly (by, for example, not notifying this predetermined information or by notifying another information).

Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean an instruction, an instruction set, a code, a code segment, a program code, a program, a subprogram, a software module, an application, a software application, a software package, a routine, a subroutine, an object, an executable file, an execution thread, a procedure or a function.

Furthermore, software, instructions and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as terms such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provides communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations or one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood in this description that, when the two elements are connected, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

In this description, the phrase that "A and B are different" may mean that "A and B are different from each other". The terms such as "decoupled" and "coupled" may be also interpreted likewise.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above, yet it is obvious for a person skilled in the art that the present invention is not limited to the embodiments described in this description. The present invention can be carried out as modified and changed aspects without departing from the gist and the scope of the present invention defined based on the recitation of the claims. Accordingly, the disclosure of this description intends for exemplary explanation, and does not have any restrictive meaning to the present invention.

The invention claimed is:

1. A terminal comprising:
   a receiver that receives higher layer signaling indicating one of a first Resource Block Group (RBG) configuration and a second RBG configuration by which a plurality of RBG size candidates are respectively configured; and
   a processor that determines a RBG size out of RBG size candidates included in an RBG configuration selected out of the first RBG configuration and the second RBG configuration,
   wherein the processor determines the RBG size based on a number of resource blocks of a specified bandwidth,
   wherein an allocation based on the first RBG configuration and an allocation based on the second RBG configuration are supported in a same time domain, and
   wherein some of the RBG size candidates included in the first RBG configuration overlap with the RBG size candidates included in the second RBG configuration while at least one of the RBG size candidates included in the first RBG configuration does not overlap with the RBG size candidates included in the second RBG configuration.

2. The terminal according to claim 1, wherein the processor determines a number of bits of a frequency resource assignment field, included in a downlink control information, based on the RBG size and the number of resource blocks of the specified bandwidth.

3. The terminal according to claim 1, wherein the specified bandwidth is configured by higher layer.

4. The terminal according to claim 1, wherein the processor controls allocation of at least one of a downlink shared channel and an uplink shared channel based on the RBG size.

5. A radio communication method for a terminal comprising:
   receiving, by the terminal, higher layer signaling wherein the higher layer signaling indicates one of a first Resource Block Group (RBG) configuration and a second RBG configuration by which a plurality of RBG size candidates are respectively configured; and
   determining, by the terminal, a RBG size out of RBG size candidates included in an RBG configuration selected out of the first RBG configuration and the second RBG configuration,
   wherein the RBG size is determined based on a number of resource blocks of a specified bandwidth,
   wherein an allocation based on the first RBG configuration and an allocation based on the second RBG configuration are supported in a same time domain, and
   wherein some of the RBG size candidates included in the first RBG configuration overlap with the RBG size candidates included in the second RBG configuration while at least one of the RBG size candidates included in the first RBG configuration does not overlap with the RBG size candidates included in the second RBG configuration.

6. The terminal according to claim 2, wherein the specified bandwidth is configured from a base station.

7. The terminal according to claim 2, wherein the processor controls allocation of at least one of a downlink shared channel and an uplink shared channel based on the RBG size.

8. The terminal according to claim 3, wherein the processor controls allocation of at least one of a downlink shared channel and an uplink shared channel based on the RBG size.

9. A base station comprising:
   a transmitter that transmits higher layer signaling indicating one of a first Resource Block Group (RBG) configuration and a second RBG configuration by which a plurality of RBG size candidates are respectively configured; and
   a processor that determines a RBG size to be used out of RBG size candidates included in an RBG configuration selected out of the first RBG configuration and the second RBG configuration,
   wherein the processor determines the RBG size based on a number of resource blocks of a specified bandwidth,
   wherein an allocation based on the first RBG configuration and an allocation based on the second RBG configuration are supported in a same time domain, and
   wherein some of the RBG size candidates included in the first RBG configuration overlap with the RBG size candidates included in the second RBG configuration while at least one of the RBG size candidates included in the first RBG configuration does not overlap with the RBG size candidates included in the second RBG configuration.

10. A system comprising a terminal and a base station, wherein
   the terminal comprises:
      a receiver that receives higher layer signaling indicating one of a first Resource Block Group (RBG) configuration and a second RBG configuration by which a plurality of RBG size candidates are respectively configured; and a processor that determines a RBG size out of RBG size candidates included in an RBG configuration selected out of the first RBG configuration and the second RBG configuration, wherein the processor determines the RBG size based on a number of resource blocks of a specified bandwidth, wherein an allocation based on the first RBG configuration and an allocation based on the second RBG configuration are supported in a same time domain, and wherein some of the RBG size candidates included in the first RBG configuration overlap with the RBG size candidates included in the second RBG configuration while at least one of the RBG size candidates included in the first RBG configuration does not overlap with the RBG size candidates included in the second RBG configuration; and the base station comprises:

a transmitter that transmits the higher layer signaling; and a processor that determines the RBG size.

* * * * *